United States Patent
Olsson et al.

[11] Patent Number: 6,119,523
[45] Date of Patent: Sep. 19, 2000

[54] METHOD AND APPARATUS FOR ELECTRONIC COMPENSATION OF ERRONEOUS READINGS CAUSED BY RESONANCE IN A CAPACITIVE PRESSURE TRANSDUCER

[75] Inventors: Ray Olsson; Per Björkman, both of Åland, Finland

[73] Assignee: Balzers and Leybold Instrumentation AB, Finland

[21] Appl. No.: 09/308,409

[22] PCT Filed: Dec. 12, 1997

[86] PCT No.: PCT/IB97/01562

§ 371 Date: Jul. 1, 1999

§ 102(e) Date: Jul. 1, 1999

[87] PCT Pub. No.: WO98/26262

PCT Pub. Date: Jun. 18, 1998

[30] Foreign Application Priority Data

Dec. 13, 1996 [FI] Finland ................................. 965016

[51] Int. Cl.[7] ................ G01L 9/12; G01L 19/04; H01G 7/00
[52] U.S. Cl. ................ 73/718; 73/724; 73/708; 361/283.4
[58] Field of Search ................ 73/724, 718, 708; 361/283.4

[56] References Cited

PUBLICATIONS

Puers B et al. "a capacitive pressure sensor with low impedance output and active suppression of parasitic effects", sensors and actuators, vol. A21, No. 1/03, Feb. 1, 1990, pp. 108–114, XP000149570.

*Primary Examiner*—Harshad Patel
*Assistant Examiner*—Abdullahi Aw-Musse
*Attorney, Agent, or Firm*—Notaro & Michalos P.C.

[57] ABSTRACT

A method for electronic compensation of erroneous readings is based on the observation that a sensor serving as a transducer is caused to resonate. The erroneous reading caused by the resonance is measured and a compensation signal is feedback into the measurement element, the signal being essentially unfiltered. An apparatus uses error detection and compensation circuits whose upper barrier frequency are above the resonance frequency of the transducer for detecting an error signal caused by resonance in the transducer and for generating a compensation signal for feeding into the detector sensor.

12 Claims, 2 Drawing Sheets

METHOD AND APPARATUS FOR ELECTRONIC COMPENSATION OF ERRONEOUS READINGS CAUSED BY RESONANCE IN A CAPACITIVE PRESSURE TRANSDUCER

FIELD AND BACKGROUND OF THE INVENTION

The present invention concerns a method for measuring pressure using a capacitive pressure transducer and a pressure measuring device comprising a capacitive pressure transducer according to the preamble of claim 10.

For considerable time it has been known in the art to measure the pressure of a fluid by monitoring the capacity of a capacitive pressure transducer comprising a membrane whose deformation depends on the pressure where the monitoring of the capacity involves applying an AC voltage to the capacitive pressure transducer. A description of the generic method and device can be found in: Hans-Werner Drawin: 'Kondensator-Membran-Manometer für Druckmessungen im Hoch- und Feinvakuumgebiet, unabhängig von der Gasart', Vakuum-Technik 7/8 (1958).

However, the result of such measurement can be affected by resonance of the capacitive pressure transducer, in particular when very small pressures are being measured using very thin membranes. It has been found that a 1 torr transducer of the generic type is very sensitive to resonance. Neither a method nor a device have been known so far where erroneous readings caused by resonance were compensated for.

SUMMARY OF THE INVENTION

Capacitive pressure transducers are known from JP-A-04 104 027 and EP-A-0 194 953. The latter may also be used for measuring force or acceleration. Its properties are determined and resonance avoided during use.

The purpose of the present invention is to remove the drawbacks of the prior art and to provide a method and device for measuring pressure where the influence of resonance in the capacitive pressure transducer is compensated.

The invention is based on the concept of causing the capacitive pressure transducer to resonate, measuring the erroneous reading caused by the resonance and feeding a feedback compensation signal to the measuring element where the signal is essentially unfiltered. The device according to the invention is based on the concept of an apparatus for compensating effects of resonance comprising error detection and compensation elements whose upper barrier frequency is above the resonance frequency of the transducer, for detecting an erroneous reading of the transducer and for generating a compensation signal to be fed into the detection elements.

More specifically, the method according to the invention is characterized by what is stated in the claims.

The apparatus according to the invention is characterized by what is stated in the claims.

The invention provides considerable benefits.

The compensation is most efficient and, in the case of undistorted self-oscillation, it will eliminate the erroneous reading to 100%.

BRIEF DESCRIPTION OF THE DRAWINGS

In the following, the invention is described by means of a detailed description and exemplifying embodiments. In the annexed drawings, preferred embodiments are shown in which.

DESCRIPTION OF THE PREFERRED EMBODIMENT

An electronic circuit is described below compensating erroneous readings caused by resonance of the membrane.

Figure 1:
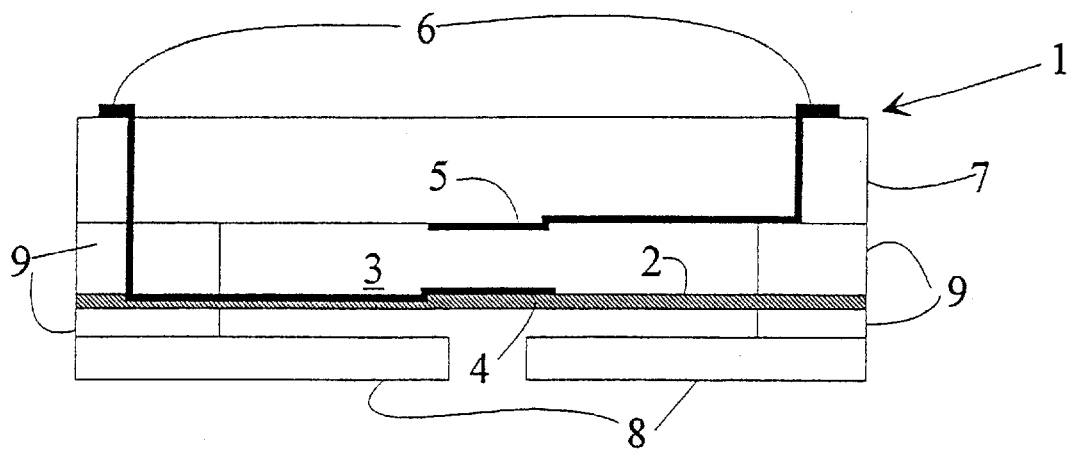
FIG. 1 is a side view of the basic scheme of a capacitive pressure transducer that can be used in the invention.

The type of pressure transducers described herein are generally called capacitance manometers. In a capacitance manometer, the pressure to be measured acts on one side of the membrane, whereas its other side is under a reference pressure which is usually very low. When pressure is measured exploiting the movements of the membrane even a number of parasitic parameters are generated which in no way contribute positively to the measurement. One of these parameters comprises the natural resonance frequency of the membrane. At this frequency the membrane self-oscillates with a minimum of external energy input. Based on mere intuition, it is obvious that such self-oscillation of the membrane will interfere with the measurement. On the basis of practical measurements it is also known that this is the case. In order to understand how such self-oscillation affects the measurement it is essential to first describe the function of the transducer element as well as the function of the electronic circuit that converts the variation in the capacitance of the transducer element into a voltage that is proportional to the current pressure. FIG. 1 depicts the transducer element with membranes and current measuring electrodes.

In order to detect the movement of the membrane 2 an electrode 4 has been arranged on its inner side in the reference vacuum space 3 and a second electrode 5 on the housing body 7 in the same space. Connecting wires 6 lead from these electrodes 4 and 5 to the outer side of the transducer housing. The membrane 2 is fixedly tensioned between the transducer housing 7 and the bottom part 8 by means of glass joints 9 and moves in toward the level of the transducer housing 7 under elevated pressure. The capacitance between the two electrodes 4 and 5 is hereby altered in accordance with the equation below.

$$C = \epsilon \frac{A}{d} \qquad (1)$$

wherein A=the surface of the electrode and d=the distance between the electrodes, and e=the dieletric constant. Thus, the capacitance is inversely proportional to the distance of the electrodes and therefore also to the pressure. The below rapport exists between the distance between the electrodes and the pressure.

$$\Delta d = p \cdot k \frac{r^4}{t^3} \qquad (2)$$

wherein r=the radius of the membrane 2 and t=the thickness of the membrane 2. p is the pressure and k represents a proportionality constant. According to the invention, in order to convert the measured capacitance into an electric signal proportional to the pressure, the below-cited measuring principle is applied.

Figure 2:
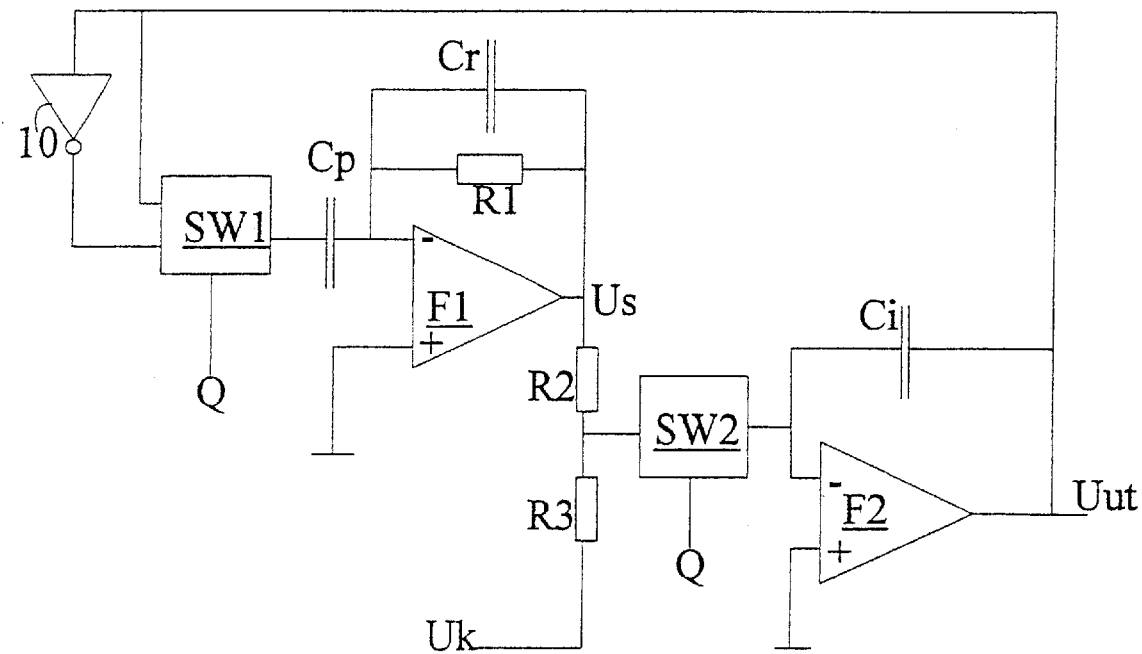
FIG. 2 depicts a typical known measuring circuit for the pressure transducer of FIG. 1.
Figure 3:
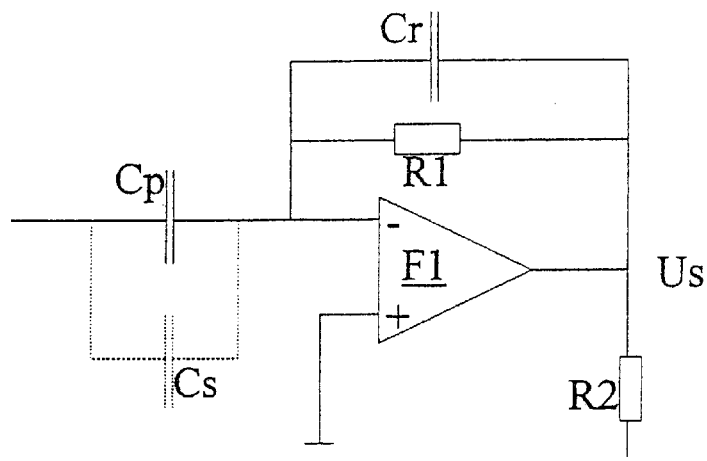
FIG. 3 is a more detailed illustration of element F1 in FIG. 2.

Cp is the capacitance between the electrodes 4 and 5 of the transducer element 1 in the capacitor according to FIG. 2 and thus, it represents the distance between these, said distance in turn being proportional to the pressure. A parallelogram signal having a frequency of 8 kHz (Q) feeds the two switches SW1 and SW2. Uk is a reference voltage which in reality is a parallelogram signal having the same frequency as Q and having a constant amplitude. Internally over the operational amplifier F1, the below rapport prevails.

$$Us = Uut \frac{Cp}{Cr} \quad (3)$$

The voltage is zero between the resistances R2 and R3 every time SW2 establishes the connection to the inverting inlet of the amplifier F2. Thus, the relation shown below exists between the currents through these resistances.

$$\frac{Us}{R2} = \frac{Uk}{R3} \quad (4)$$

As a result $$Us = Uk \frac{R2}{R3} \quad (5)$$

If equation 3 is combined with equation 5, the following is obtained $$Uk \frac{R2}{R3} = Uut \frac{Cp}{Cr} \quad (6)$$

leading to $$Uut = Uk \frac{Cr}{Cp} \frac{R2}{R3} \quad (7)$$

and if R2=R3

That is, the output signal is proportional to the reference voltage Uk $$Uut = Uk \frac{Cr}{Cp} \quad (8)$$

and the reference capacitance Cr and inversely proportional to the measured capacitance. Thus, in accordance with Eq. 1 the output signal is proportional to the distance between the electrodes wherefore it is also proportional to the pressure.

During normal pressure measurement, the membrane is shifted in relation to the pressure, whereby the distance between the electrodes is altered resulting in altered capacitance. The force of the medium against the membrane is in this case balanced by the counter force of the membrane generated by its elasticity. If the membrane is instead exposed to a short force pulse, generated, for instance, by acceleration in accordance with F=m·a, the membrane is transferred in proportion to this force while it lasts. When the force ceases to act there is no balance between this force and the counter force of the membrane, wherefore the membrane springs back. This results in that the membrane for a short while oscillates back and forth round its position of equilibrium.

The oscillation is damped and occurs at the resonance frequency of the membrane. If force is instead introduced in the form of pulses or waves in the material having the same frequency as the resonance frequency of the membrane, the self-oscillation is increased and then maintained constant at a certain amplitude where the introduced energy and energy losses are the same. In connection with this type of membrane movement (resonance) the amplitude can become great and even exceed the entire normal measurement range. In spite of this circumstance the membrane still measures the static pressure of the gas in front of the membrane. However, a positive deviation is now added to the measurement result, the deviation being proportional to the quadrature of the amplitude of the self-oscillation. In view of the transfer function Uut=Uk·Cr/Cp a harmonic movement (self-oscillation) where the positive and negative amplitude of the membrane are of equal size should in fact generate an outgoing signal reflecting this, i.e. Uut varies symmetrically with the amplitude of this self-oscillation. The typical resonance frequency for these membranes, however, lies between 1000 and 2000 Hz, wherefore the above relation for Uut is not valid at the resonance frequency. The switching frequency of the connection is determined by the integrator. The connection between C1 and R2, R3 is usually such that the switching frequency is around 30 Hz. During resonance the frequency is so high that Uut does not have time to vary. Instead, Uut remains still at a mean value. Internally over F1 the condition at the resonance frequency is totally different from the condition during normal measurement. During normal measurement, Us is constant and Us=Uk and Uut varies during a change in capacitance such that this is met. At the resonance frequency, Uut remains constant and Us=Uut Cp/Cr, i.e. Us varies with the capacitance. The mean value for Us is now during symmetrical variation of d not the same as during non-self-oscillation. The mean value of Us is shifted with the amplitude of the self-oscillation.

I.e.: $\Delta|Us|=f(\Delta d^2)$

This shift is proportional in the second power to the amplitude of the self-oscillation. Thus, the circuit will see a state where the mean value of Us during resonance seems to be shifting. In reality, this shift does not occur at the resonance frequency but instead at a frequency below the switching frequency, whereby equation 8 is valid. Instead, Uut is now shifted, with Us trying to be=Uk. The amplifier acts as a mixer between high-frequency and low-frequency information. This is not the only way in which Uut can be shifted due to vibration. Referring back to the switch diagram round F1, a stray capacitance has been added to the measured capacitance.

This extra capacitance can in reality be constituted by all additional capacitive connections between the inverted input of the amplifier F1 and the feed from SW1. One thing all these extra capacitances (stray capacitances) have in common is that they do not constitute a function of the pressure. If the stray capacitance is then put into the transfer function the following is obtained:

$$Uut = Uk \frac{Cr}{Cp + Cs} \quad (9)$$

If the membrane is further allowed to self-oscillate the following is obtained:

$$Cp = \frac{k}{d_0(1 + m \cdot \cos\omega t)} \quad (10)$$

leading to $$Uut = Uk \frac{Cr}{\frac{k}{d_0(1 + m \cdot \cos\omega t)} + Cs} \quad (11)$$

Uut is altered such that it is dependent of $m \cdot d_o$ in the second power. "$m \cdot d_o$" constitutes the amplitude of the distance between the electrodes. As before, Uut will not have time to follow the resonance frequency but will indicate the mean value. Us will not be equal to Uk at the resonance frequency but will instead vary proportional to the capacitance. The mean value for the variation of Us will be shifted in the manner of direct voltage to the second power in relation to $m \cdot d_o$ whereby Uut assumes a new value such that Us=Uk can prevail in the manner of direct voltage. The relation is the same as in the previous case. The basic reason in both cases is that Us gets additional ΔUs during resonance, whereby Us+ΔUs=Uk. Thus, by measuring Us it is possible to obtain a measurement of the fictitious shift of Uk and to compensate the unbalance. The compensation signal is obtained in the following manner. Us can be separated by measuring the difference between Us and Uk by means of a circuit whose barrier frequency is clearly beyond the resonance frequency. As is known, Us is a sinusoidal voltage with the resonance frequency of the membrane. This alternating voltage is amplified, rectified, filtered and scaled for returning to the summing point between R2 and R3.

Figure 4:
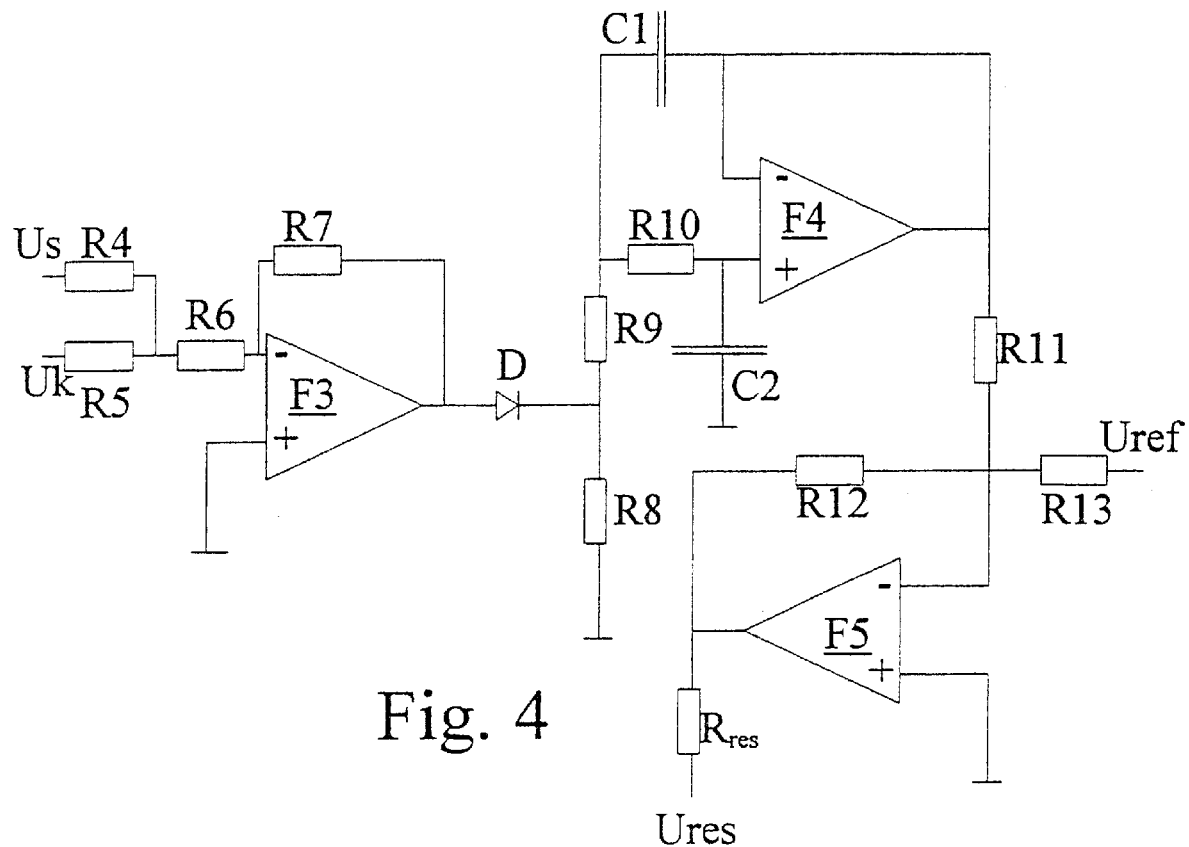
FIG. 4 depicts a coupling according to the invention for electronic compensation of erroneous readings caused by resonance in a capacitive pressure transducer.

FIG. 4 shows the circuit in practice. The signal Us is compared to Uk between the resistances R4 and R5 and is then amplified. After amplification by the amplifier F3 the signal is rectified by the diode D and is filtered by the low-pass filter F4, and at the output phase offset is adjusted by F5, whereafter the output voltage Ures is fed back to the nodal point between R2 and R3 via a resistor $R_{res}$.

In practice the compensation takes place such that the membrane is caused to resonate by means of a variable tone generator. The erroneous reading of the output signal is recorded during resonance as compared to non-resonance. The signal Ures from the compensation circuit is switched and scaled until no difference between Uut during resonance and non-resonance is measurable. The compensation is very efficient and, in the case of undistorted self-resonance, able to eliminate the erroneous reading to 100%. This can be done during calibration of the transducer.

Resonance problems of this type can occur in certain systems due to unsuccessful coaction of vibrations from pumps and the system design. The compensation circuit is in such case a must if measurements are to be performed. Often the resonance in such cases tends to be variable in time and size, wherefore the output signal without compensation varies in the second power in view of these error sources in a most disturbing ripple.

As an alternative to diode rectification, the measurement signal can be rectified by quadration.

According to the invention a rectifier can even be used which generates a voltage that is a function of the amplitude of the membrane oscillation.

According to the invention the measurement error can also be made modulation dependent in the desired manner by varying the amplification prior to the rectifier and by varying the degree of modulation where the error is zero.

What is claimed is:

1. A method for measuring pressure using a capacitive pressure transducer (1) and determining the capacitance of the capacitive pressure transducer (1) by AC measurement, wherein erroneous readings due to resonance in the capacitive pressure transducer (1) are electronically compensated, the method comprising:

artificially causing the capacitive pressure transducer (1) to resonate, measuring an error ($\Delta U_s$) caused by the resonance of the transducer (1) in a measurement circuit, and feeding a compensation signal ($U_{res}$) into the measurement circuit which completely eliminates the erroneous reading.

2. The method of claim 1, wherein the capacitive pressure transducer (1) is caused to resonate in a separate calibration of the transducer.

3. The method of claim 1, wherein the compensation signal is fed into the measurement circuit between an amplifier (F1) and an integrator (F2).

4. The method of claim 1, wherein the AC voltage from the capacitive pressure transducer (1) is rectified.

5. The method of claim 1, wherein the AC voltage from the transducer is impedance transformed using a capacitive-feedback operational amplifier.

6. The method of claim 1, wherein the measurement signal is low-pass filtered.

7. The method of claim 1, wherein the measurement signal is rectified by quadration.

8. The method of claim 1, wherein a rectifier is used which generates a voltage which is a function of the amplitude of a membrane oscillation of the transducer.

9. The method of claim 1, wherein the measurement error is rendered modulation dependent by varying the amplification prior to the rectifying and by varying the degree of modulation where the error is zero.

10. A pressure measuring device comprising: a capacitive pressure transducer (1) and detector means (SW1, F1, F2) for simultaneous detection of the position of a sensing membrane (2) of the capacitive pressure transducer (1) and of pressure, and means for electronic compensation of erroneous readings caused by resonance in the capacitive pressure transducer (1) including error detection and compensation means (F3, F4, F5) having an upper barrier frequency above the resonance frequency of the transducer (1) for detecting the erroneous reading caused by resonance in the capacitive pressure transducer (1) and for generating a compensation signal (Ures) for feeding into the detector means (SW1, F1, F2).

11. the device of claim 10, further comprising an amplifier (F3), a rectifier (D), a filter (F4) and a scaling device (F5) connected to the transducer.

12. The device of claim 10, including means for artificially causing the capacitive pressure transducer to resonate.

* * * * *